May 15, 1962 C. R. BANDY 3,034,493
SUCTION SAWDUST COLLECTOR
Filed July 24, 1959

INVENTOR
C.R. BANDY

BY *Ayers Davell*
ATTORNEY

United States Patent Office 3,034,493
Patented May 15, 1962

3,034,493
SUCTION SAWDUST COLLECTOR
Charles R. Bandy, 2915 Carl Terrace, Orlando, Fla.
Filed July 24, 1959, Ser. No. 829,444
2 Claims. (Cl. 125—13)

This invention relates to the production of products utilizing mechanical tools or other devices of various kinds including saws in the cutting of stone and other objects, and to the removal of small particles such as sawdust which tend to interfere with the work performed and which sometimes get into the body of the workmen through the nose, eyes, or other parts of the body.

The invention is concerned primarily with the removal of small waste particles whether in the form of impalpable powder or larger particles and to equipment for removing such particles including either suction or some other means.

Devices of various kinds have been produced in an effort to remove small particles including dust and whether from a saw or other device from machines and tools of various kinds. Such devices have not been fully satisfactory particularly in connection with hand tools employed for cutting stone or relatively hard materials, some of which devices being complicated, expensive and inefficient and ordinarily added enough bulk to conventional tools to render them cumbersome and unsatisfactory.

It is an object of the invention to overcome the difficulties enumerated and to provide a relatively simple and inexpensive small particle removal device for application to a saw for cutting stone or other hard substances and resulting in a by-product of small particles of dust which are a nuisance in the performance of work as well as injurious to the physical well-being of the workmen.

Another object of the invention is to provide a device which can be applied to conventional tools and which is designed to offer least interference in the use of the same.

Another object of the invention is to provide a dust and small particle collector which can be applied as a protective housing for the saw blade of a hand tool with a suction tube for removing dust and small particles produced by the saw.

A further object of the invention is to provide a casing for a rotary saw, which casing is composed of two cooperative parts hinged together and with an access opening and a cover plate in the side remote from the tube as well as a suction tube for removing dust and small particles produced by the cutting action of a saw.

Figure 1:
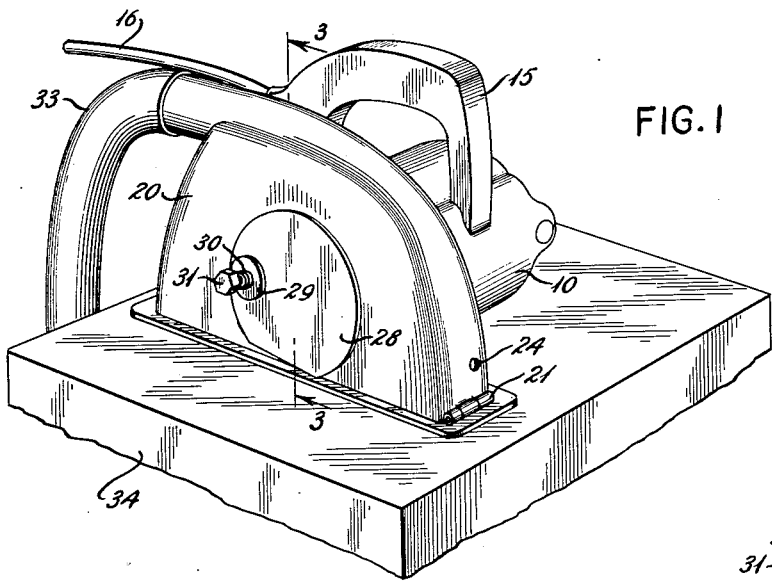
Figure 3:
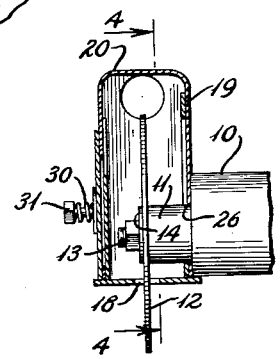
Figure 2:
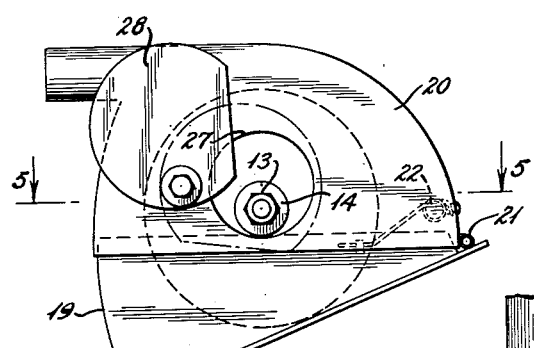
Figure 4:
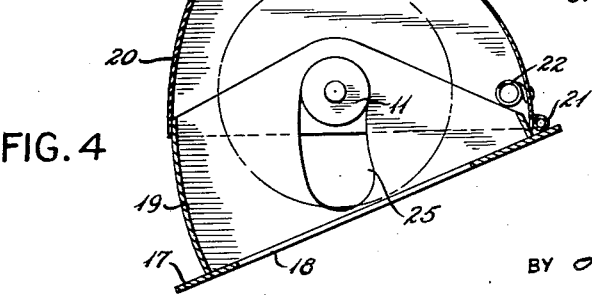

Other objects and advantages of the invention will be apparent from the following description taken in conjunction with the accompanying drawings, in which:

FIG. 1 is a perspective illustrating one application of the invention and the use of the same;

FIG. 2, a side elevation with parts in a different position than in FIG. 1;

FIG. 3, a vertical section on the line 3—3 of FIG. 1;

FIG. 4, a vertical section on the line 4—4 of FIG. 3; and

Figure 5:
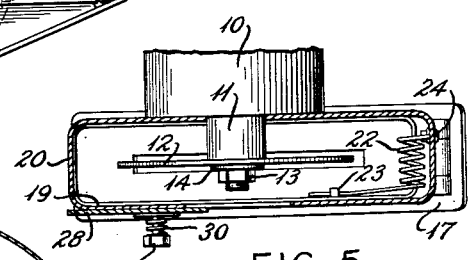

FIG. 5, a horizontal section on the line 5—5 of FIG. 3.

Briefly stated, the invention is a device to collect dust and small particles during the sawing of relatively large materials such as masonry, stone and the like and it is designed to provide a casing or housing for a portable hand saw and with a hose attached to suction producing mechanism so that the small particles of dust will be drawn into such hose and collected. The casing or housing is generally a hollow semi-circular body of two pivotally connected sections, one having a flat side so that it may be placed over the saw and with the remote portion of the complementary section provided with a tangential connection to a suction hose. Also the casing or housing is provided with an access opening in each side and with a cover plate for the one on the side remote to the saw carrying tool.

With continued reference to the drawing, a portable hand tool for sawing stone or other substance includes a motor 10, a saw shaft or arbor 11, and a saw 12 attached to said shaft by means of a nut 13 bearing against a washer 14. To the motor is attached a handle 15 by which the device can be manipulated, power being supplied through an electrical conductor 16 from a convenient source of power (not shown).

In use the device is adapted to be gripped by the handle 10 and the saw 12 guided to perform the cutting operation. It is desirable to provide protective means for preventing accidental contact of the workmen with the saw and to prevent dust and particles being thrown by the saw. Also it is desirable to remove the dust and small particles resulting from the cutting operation. In order to accomplish this, a combination guard and particle removal device is provided in the form of a casing or housing adapted to be placed over the saw.

The casing or housing may include a generally rectangular base plate 17 having a slot 18 in which the blade of the saw is adapted to be disposed. A hollow generally rectangular member 19 is welded or otherwise secured to the plate 17 for cooperation with a cap or upper member 20 also of generally rectangular cross-section and in the lower portion of which the upper portion of the hollow member 19 is adapted to be received, the member 20 being connected by a hinge 21 with the base plate 17 and a spring 22 being employed for normally maintaining the casing or housing members 19 and 20 in expanded position, such spring having one end anchored within an opening in a lug 23 attached to the lower member 19 and connected by a bolt 24 with the upper of the two members 20 which form the casing or housing.

The casing section 19 is provided with a slot 25 in which is received the saw arbor or shaft 11 which limits the separation of the members 19 and 20 due to the arbor coming in contact with the end of the slot 25. The casing section 20 also has a circular opening 26 through which said arbor or shaft attached to the motor 10 and carrying the saw 12 projects.

The casing or housing section 20 is provided with an access opening 27 through which access can be had to the nut 13, such access opening being closed by a cover plate 28 engaged by a washer 29 against which a spring 30 is caused to bear by means of the head of a fastener such as a screw or bolt 31 and thus resiliently maintain the cover plate in position but permitting it to be readily moved from such position to afford access to the interior of the casing or housing.

The section 20 of the casing is provided with a tubular connection 32 for the attachment of a suction tube extended to a source of suction, such tube being flexible to permit the free use of the saw on masonry, stone or other hard substance 34.

It will be apparent from the foregoing that a relatively simple guard-forming casing or housing for a saw is provided with the upper portion of the casing or housing connected by means of a flexible tube to a source of suction so that said tube readily may be used to cut masonry or the like and the device is relatively simple and inexpensive and offers minimum interference with the use of the tool while providing maximum protection to the user and adequate removal of the dust and particles resulting from the use of the saw.

It will be obvious to one skilled in the art that various changes may be made in the invention without departing from the spirit and scope thereof and therefore the inven-

What is claimed is:

1. A combination extensible guard-forming and suction housing and a manually movable rotary saw, said combination guard and housing including a generally rectangular base plate having a saw slot therein, a hollow generally rectangular housing member fixed to said base plate about said saw slot, a second housing member of generally complementary shape and telescopic relative to said hollow generally rectangular member hinged to said base plate, means for limiting the separating movement of said housing members one relative to the other, spring means for urging said housing members toward separating position, a suction tube in connection with the second of said housing members and subject to a source of suction for removing dust and small particles.

2. A combination extensible guard and suction housing and a manually movable saw mounted for operation in said housing, said combination guard and housing comprising a base having a saw slot therein, a hollow housing member fixed to said base about said saw slot, a second housing member of generally complementary shape and telescopic relative to said hollow housing member and hinged to said base, means for limiting the relative separating movement of said housing members, means urging said housing members apart, suction means in connection with the second of said housing members for removing dust and small particles from around said saw, and a motor attached to said second housing and having its shaft supporting said saw.

References Cited in the file of this patent

UNITED STATES PATENTS

| | | |
|---|---|---|
| 1,174,659 | Bilicki | Mar. 7, 1916 |
| 1,811,577 | Crowe | Jan. 23, 1931 |
| 1,827,270 | Smith | Oct. 13, 1931 |
| 1,888,679 | Knapp | Nov. 22, 1932 |
| 2,419,744 | Thwaites | Apr. 29, 1947 |
| 2,441,535 | Sanders | May 11, 1948 |
| 2,487,277 | Siftar | Nov. 8, 1949 |

FOREIGN PATENTS

| | | |
|---|---|---|
| 352,638 | France | Apr. 16, 1905 |
| 715,760 | Great Britain | Sept. 15, 1954 |
| 581,040 | Germany | July 20, 1933 |